United States Patent
Okamura et al.

[11] Patent Number: 5,857,734
[45] Date of Patent: Jan. 12, 1999

[54] ENERGY ABSORBING STRUCTURE FOR SIDE PORTION OF VEHICLE BODY

[75] Inventors: Shotaro Okamura, Toyota; Masayoshi Takahashi; Joichi Bansho, both of Himi, all of Japan

[73] Assignees: Toyota Jidosha Kabushiki Kaisha, Toyota; Aisin Keikinzoku Kabushiki Kaisha, Shinminato, both of Japan

[21] Appl. No.: 802,921

[22] Filed: Feb. 20, 1997

[30] Foreign Application Priority Data

Mar. 13, 1996 [JP] Japan .................................. 8-056472

[51] Int. Cl.$^6$ .............................. B60J 5/04; B60R 21/02
[52] U.S. Cl. .................... 296/189; 296/146.6; 280/748
[58] Field of Search .................... 296/188, 189, 296/146.6; 280/748; 188/371, 377

[56] References Cited

U.S. PATENT DOCUMENTS

| | | | |
|---|---|---|---|
| 4,272,103 | 6/1981 | Schmid et al. ............................. | 280/751 |
| 4,890,877 | 1/1990 | Ashtiani-Zarandi et al. .......... | 296/153 |
| 4,978,562 | 12/1990 | Wycech ................................ | 296/188 X |
| 5,093,990 | 3/1992 | Klippel ................................ | 296/188 X |
| 5,094,034 | 3/1992 | Freeman ................................ | 49/501 |
| 5,098,124 | 3/1992 | Breed et al. ........................... | 280/751 |
| 5,102,163 | 4/1992 | Ishikawa ............................... | 296/188 X |
| 5,171,058 | 12/1992 | Ishikawa ............................... | 296/189 |
| 5,306,066 | 4/1994 | Saathoff ............................... | 296/146.6 |
| 5,435,619 | 7/1995 | Nakae et al. ........................... | 296/189 |

FOREIGN PATENT DOCUMENTS 7-89346  4/1995  Japan .

OTHER PUBLICATIONS

Examples of Automotive Technology—No. 94602—Nov. 30, 1994—(See Application p. 4).
Examples of Automotive Technology—No. 95352—Jul. 28, 1995—(See Application p. 1).

*Primary Examiner*—Dennis H. Pedder
*Attorney, Agent, or Firm*—Pillsbury Madison & Sutro LLP

[57] ABSTRACT

An energy absorbing structure for a side portion of a vehicle body includes a plastically deformable energy absorbing member which is disposed at a predetermined position in the side portion of the vehicle body against which a side portion of an upper part of a vehicle occupant's body hits during a side collision, the energy absorbing member being arranged such that a longitudinal direction thereof coincides with a longitudinal direction of the vehicle body, a cross section of the energy absorbing member being formed in the shape of a substantially hollow ellipse in which a direction of a short axis thereof is a transverse direction of the vehicle body and a direction of a long axis thereof is a vertical direction of the vehicle body, the wall thickness of the energy absorbing member being set such that the wall thicknesses of long-axis portions thereof corresponding to the long axis are greater than the wall thicknesses of short-axis portions thereof corresponding to the short axis.

17 Claims, 11 Drawing Sheets

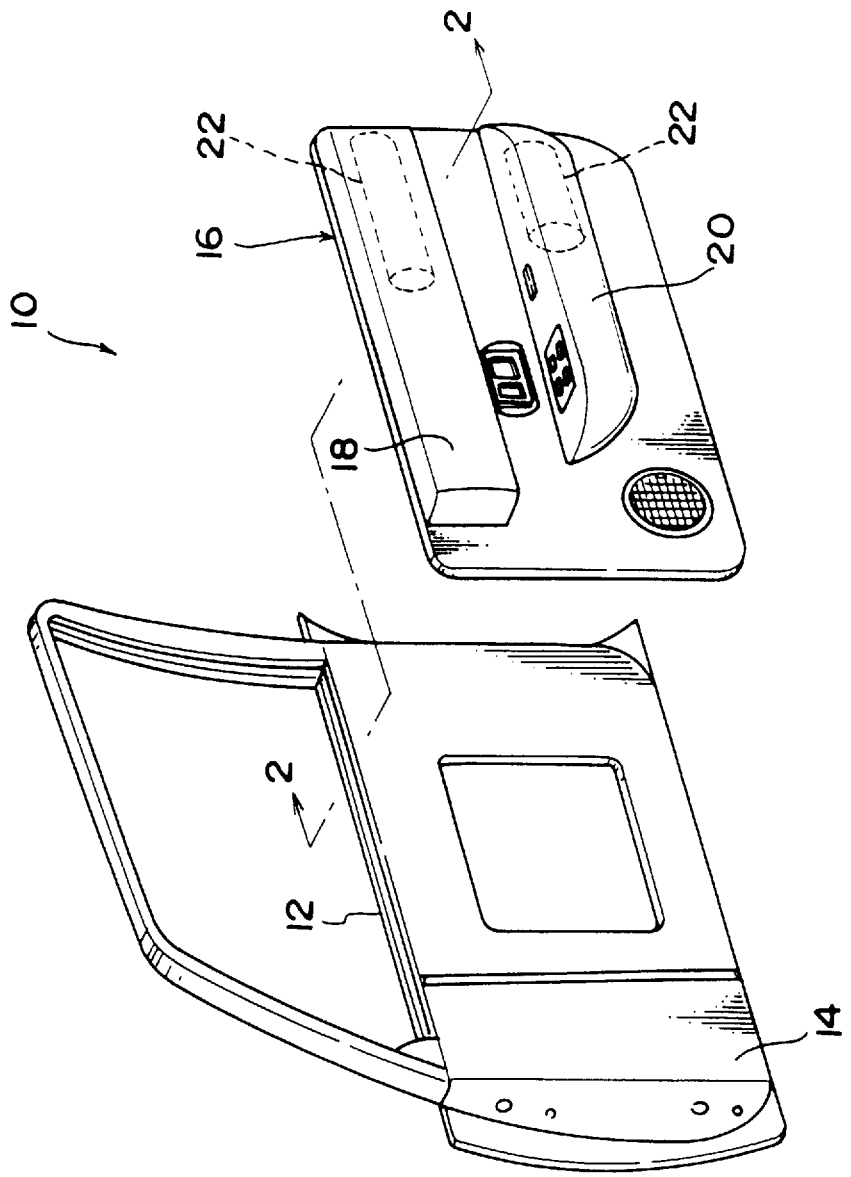

F I G. 8
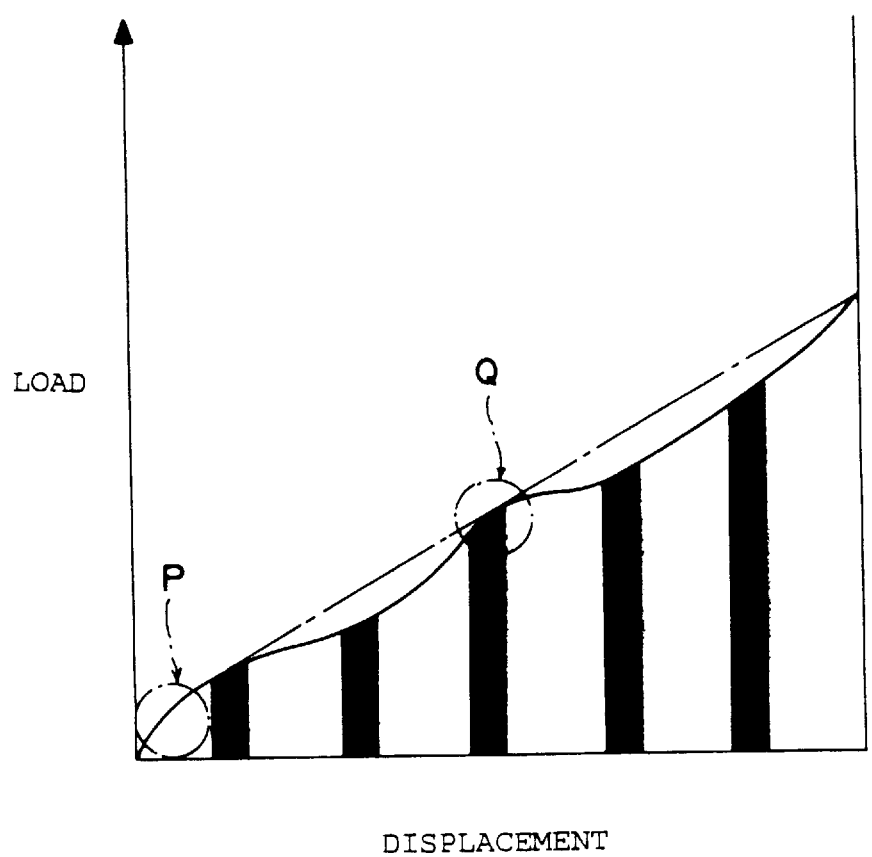

ENERGY ABSORBING STRUCTURE FOR SIDE PORTION OF VEHICLE BODY

BACKGROUND OF THE INVENTION

1. Field of the Invention

The present invention relates to an energy absorbing structure for a side portion of a vehicle body for protecting a vehicle occupant during a side collision of a vehicle.

2. Description of the Related Art

In recent years, in vehicles, particularly in automobiles, various countermeasures against side collisions have come to be adopted to improve the performance of protection of a vehicle occupant during a side collision. As one technique of this type of countermeasure against a side collision, the provision of an energy-absorbing structure in a side door has been conventionally practiced. The Jidosha Gijutsu Jireishu (Collection of Examples of Automotive Technology) No. 95352 published by the Intellectual Property Sub-Committee of the Japan Automobile Manufacturers Association, Inc. discloses a door structure in which an air-conditioning air duct for a vehicle rear seat is disposed in that vehicle compartment-side shoulder portion of a door for a vehicle front seat which is located in the vicinity of a window, so as to absorb an impact at the time of a side collision. In addition, Japanese Patent Application Laid-Open (JP-A) No. 7-89346 discloses a structure for reinforcing a vehicle door in which a guide bar (i.e., an impact beam) in a door panel is covered with a large-diameter pipe so as to absorb impact energy during a side collision. Hereafter, consideration will be given of other examples.

In the structure shown in FIG. 9, energy absorbing members 106, each formed separately and made of urethane foam, styrene foam, or the like, are respectively disposed between an upper portion 100A of a door trim 100 and a door inner panel 104 of a side door 102 and between a lower portion (armrest) 100B of the door trim 100 and the door inner panel 104.

In accordance with the above-described arrangement, when a door outer panel 108 of the side door 102 is deformed toward the inner side of a vehicle compartment during a side collision (behavior during a primary collision), the upper part of the occupant's body moves toward the door inner panel 104 side as a reaction at that time, and hits against the upper portion 100A of the door trim 100 (behavior during a secondary collision). At this time, the energy at the time when a chest portion of the occupant undergoes the secondary collision is absorbed through the elastic deformation of the energy absorbing member 106 located on the upper side, while the energy at the time when a waist portion of the occupant undergoes the secondary collision is absorbed through the elastic deformation of the energy absorbing member 106 located on the lower side.

However, with the above-described arrangement, since the bulk compressibility of the energy absorbing member 106 is set to approximately 70% by taking into consideration the material and the energy absorption characteristic, there is a disadvantage in that the thickness $D_1$ of the energy absorbing member 106 provided for the chest becomes large in order to obtain a deformation stroke necessary for protection of the occupant.

Meanwhile, in the structure shown in FIG. 10, energy absorbing members 110 with a substantially hat-shaped cross section, each formed integrally on the door inner panel 104 and made of a thin steel sheet or the like, are respectively disposed between the upper portion 100A of the door trim 100 and the door inner panel 104 of the side door 102 and between the lower portion 100B of the door trim 100 and the door inner panel 104.

In accordance with the above-described arrangement, the absorption of energy at the time of the secondary collision of the occupant is effected in a similar manner. In addition, since the bulk compressibility of the energy absorbing member 110 can be set to 90% or more, it is possible to secure the deformation stroke necessary for protection of the occupant without enlarging the thickness (depth) $D_2$ of the energy absorbing member 110 provided for the chest.

However, with the above-described arrangement, as shown in FIG. 11, the load is substantially fixed irrespective of an increase in displacement even from the initial period of the secondary collision of the occupant. Here, since the characteristic indicated by the chain line in the drawing, i.e., the characteristic in which the load increases at a fixed rate with an increase in displacement, is a targeted characteristic, there is room for improvement.

Incidentally, it is conceivable to provide energy absorbing members with a circular cross section (e.g., pipes made of an aluminum alloy) instead of the energy absorbing members 110 with a hat-shaped cross section (as a disclosed example, the Jidosha Gijutsu Jireishu (Collection of Examples of Automotive Technology) No. 94602 published by the Intellectual Property Sub-Committee of the Japan Automobile Manufacturers Association, Inc. is known). In this case, however, the energy absorbing member is difficult to undergo plastic deformation (difficult to crush) in an initial period of the secondary collision, and there is a tendency that the plastic deformation subsequently proceeds at a stroke. As a result, although, as a whole, the energy absorption characteristic becomes closer to the targeted characteristic than in the case where the energy absorbing members 110 with a hat-shaped cross section are used, there is room for improvement in that the rise in the load during the initial period of the secondary collision becomes sharp.

SUMMARY OF THE INVENTION

In view of the above-described circumstances, it is an object of the present invention to provide an energy absorbing structure for a side portion of a vehicle body which makes it possible to obtain an ideal energy absorption characteristic during a side collision, i.e., an energy absorption characteristic in which while a sharp rise in the load during an initial period of the secondary collision of the occupant is being suppressed, the load subsequently increases at a fixed rate with an increase in displacement.

In accordance with a first aspect of the present invention, there is provided an energy absorbing structure for a side portion of a vehicle body, comprising: a plastically deformable energy absorbing member which is disposed at a predetermined position in the side portion of the vehicle body against which a side portion of an upper part of a vehicle occupant's body hits during a side collision, the energy absorbing member being arranged such that a longitudinal direction thereof coincides with a longitudinal direction of the vehicle body, a cross section of the energy absorbing member being formed in a shape of a substantially hollow ellipse in which a direction of a short axis thereof is a transverse direction of the vehicle body and a direction of a long axis thereof is a vertical direction of the vehicle body, a wall thickness of the energy absorbing member being set such that wall thicknesses of long-axis portions thereof corresponding to the long axis are greater than wall thicknesses of short-axis portions thereof corresponding to the short axis.

In accordance with a second aspect of the present invention, in the energy absorbing structure for a side portion of a vehicle body according to the first aspect of the invention, the ellipticity of the energy absorbing member is set to approximately 0.7, and a ratio of the wall thicknesses of the short-axis portions to the wall thicknesses of the long-axis portions of the energy absorbing member is set to be greater than or equal to 0.3 and not more than 0.6.

In accordance with a third aspect of the present invention, in the energy absorbing structure for a side portion of a vehicle body according to the first and second aspects of the invention, the energy absorbing member is provided with a high-rigidity portion disposed in each of the long-axis portions for enhancing rigidity in the transverse direction of the vehicle body.

In accordance with a fourth aspect of the present invention, in the energy absorbing structure for a side portion of a vehicle body according to the first to third aspects of the invention, the energy absorbing member is disposed between a door inner panel constituting a part of a side door and a door trim disposed at a vehicle transverse direction inner side of the door panel, and the short-axis portion located on an inner side in the transverse direction of the vehicle body is secured to a vehicle compartment outer-side surface of the door trim by means of an adhesive.

In accordance with a fifth aspect of the present invention, in the energy absorbing structure for a side portion of a vehicle body according to the fourth aspect of the invention, the energy absorbing member is disposed in such a manner as to be provided with a gap with respect to the door inner panel.

In accordance with the first aspect of the present invention, since the cross section of the energy absorbing member is formed in the shape of a substantially hollow ellipse in which the direction of the short axis thereof is the transverse direction of the vehicle body and the direction of the long axis thereof is the vertical direction of the vehicle body, as compared with a case where the cross section of the energy absorbing member is formed in the shape of a hollow circle, the energy absorbing member is liable to undergo plastic deformation starting from the initial period of the secondary collision of a side portion of the upper part of the occupant's body.

In addition, in the present invention, since the wall thicknesses of the long-axis portions are made greater than the wall thicknesses of the short-axis portions, when the side portion of the upper part of the occupant's body undergoes the secondary collision, the plastic deformation proceeds consecutively from the short-axis portions, i.e., thin-walled portions, toward the long-axis portions, i.e., thick-walled portions, and the load increases at a fixed rate in conjunction with it.

Consequently, the energy absorption characteristic in the case where the present invention is applied becomes one in which while a sharp rise in the load during the initial period of the secondary collision of the occupant is being suppressed, the load subsequently increases at a fixed rate with an increase in displacement.

In addition, in accordance with the present invention, the energy absorption characteristic can be arbitrarily adjusted by appropriately changing the ellipticity and the wall thickness ratio, and in this sense an outstanding advantage can be offered in that it is readily possible to tune the energy absorption characteristic.

Furthermore, in accordance with the present invention, since the cross section of the energy absorbing member is formed in the shape of a substantially hollow ellipse, the assembling direction becomes clear and cases of erroneous assembly can be eliminated as compared with a case where the cross section is formed in the shape of a hollow circle. For this reason, it is possible to obtain an outstanding advantage in that the operating efficiency in assembling the energy absorbing member can be improved.

In accordance with the second aspect of the present invention, in the first aspect of the invention, since the ellipticity of the energy absorbing member is set to approximately 0.7, and the ratio of the wall thicknesses of the short-axis portions to the wall thicknesses of the long-axis portions of the energy absorbing member is set to be greater than or equal to 0.3 and not more than 0.6, it is possible to provide a gentler rightwardly rising, ideal energy absorption characteristic.

In accordance with the third aspect of the present invention, in the first and second aspects of the invention, since the energy absorbing member is provided with the high-rigidity portion disposed in each of the long-axis portions for enhancing rigidity in the transverse direction of the vehicle body, when the side portion of the upper part of the occupant's body undergoes the secondary collision, the energy absorbing member is liable to undergo plastic deformation from the initial period of the collision, and the plastic deformation proceeds consecutively from the short-axis portions, i.e, the thin-walled side, toward the long-axis portions, i.e., the thick-walled side. Further, as the high-rigidity portion undergoes plastic deformation in the transverse direction of the vehicle body, the load increases. In addition, it is possible to obtain an outstanding advantage in that an even more ideal energy absorption characteristic can be obtained from the initial period of the side collision.

In accordance with the fourth aspect of the present invention, in the first to third aspects of the invention, since the energy absorbing member is disposed between the door inner panel of the side door and the door trim disposed at the vehicle transverse direction inner side of the door panel, and the short-axis portion located on the inner side in the transverse direction of the vehicle body is secured to the vehicle compartment outer-side surface of the door trim by means of an adhesive, the portion of the energy absorbing member bonded to the vehicle compartment outer-side surface of the door trim is bonded not by bonding based on line contact but by bonding based on surface contact. For this reason, it is possible to enlarge the bonding area of the energy absorbing member. Accordingly, it is possible to prevent the energy absorbing member from becoming dislocated and slipping off due to vibrations of the vehicle body at high temperature over extended periods of time.

In accordance with the fifth aspect of the present invention, in the fourth aspect of the invention, since a predetermined gap is set between the energy absorbing member and the door inner panel, even if the vibrations of the vehicle body are applied, the energy absorbing member and the door inner panel are prevented from sliding relative to each other. Accordingly, it is possible to obtain an outstanding advantage in that the occurrence of abnormal noise between the two members can be prevented.

The above and other objects, features and advantages of the present invention will become more apparent from the following detailed description of the invention when read in conjunction with the accompanying drawings.

BRIEF DESCRIPTION OF THE DRAWINGS

FIG. 3 is a perspective view of a door trim illustrated in a state of being separated from the side door;

FIG. 8 is a characteristic diagram illustrating an energy absorbing characteristic during a side collision in a case where the energy absorbing member shown in FIG. 6 is used;

DESCRIPTION OF THE PREFERRED EMBODIMENTS

Referring now to FIGS. 1 to 5, a description will be given of a first embodiment of the present invention. It should be noted that, in FIGS. 1 and 2, the arrow UP denotes an upward direction of the vehicle, and the arrow IN denotes a transversely inward direction of the vehicle.

Figure 2:
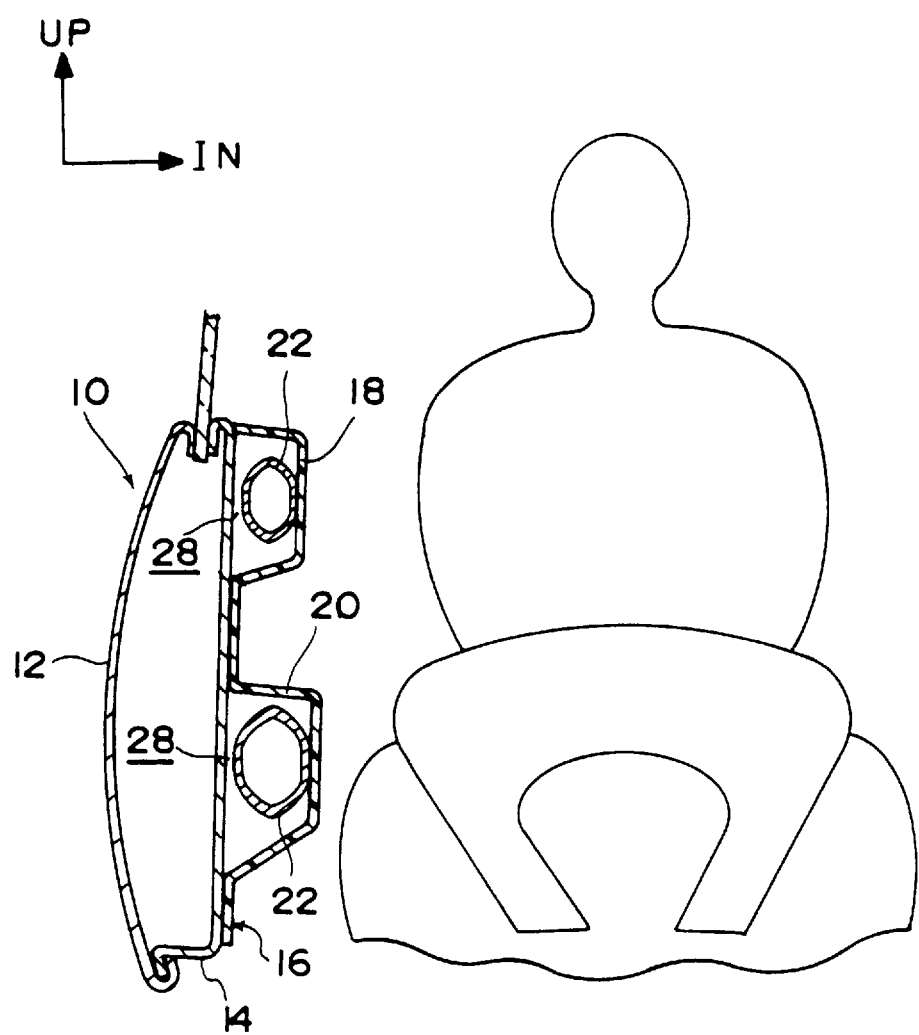
FIG. 2 is a front elevational view which illustrates a side door in which an energy absorbing member shown in FIG. 1 is disposed, in terms of its relationship with an upper part of a vehicle occupant's body.

As shown in FIGS. 2 and 3, a side door 10 is comprised of a door outer panel 12 disposed on the outer side of a vehicle compartment; a door inner panel 14 disposed on the inner side of the vehicle compartment; and a door trim 16 attached to a surface of the door inner panel 14 on the inner side of the vehicle compartment.

An upper portion 18 of the door trim 16 protrudes toward the inner side of the vehicle compartment. Also, on the lower side of the door trim 16, an armrest 20 provided with operating switches for a power window protrudes toward the inner side of the vehicle compartment. Incidentally, the door trim 16 arranged as described above is an integrally formed product made of a resin and formed by laminating a substrate layer, a surface layer, and the like.

Pipe-shaped energy absorbing members 22 of the same structure, whose longitudinal direction coincides with the longitudinal direction of the vehicle, are respectively disposed between the upper portion 18 of the above-described door trim 16 and the door inner panel 14 and between the armrest 20 of the door trim 16 and the door inner panel 14. Incidentally, during a side collision, since a chest portion of the occupant hits against the upper portion 18 of the door trim 16, and a waist portion of the occupant hits against the armrest 20 of the door trim 16, the energy absorbing member 22 disposed in the vicinity of the upper portion 18 serves to protect the chest of the occupant, while the energy absorbing member 22 disposed in the vicinity of the armrest 20 serves to protect the waist of the occupant.

Figure 1:
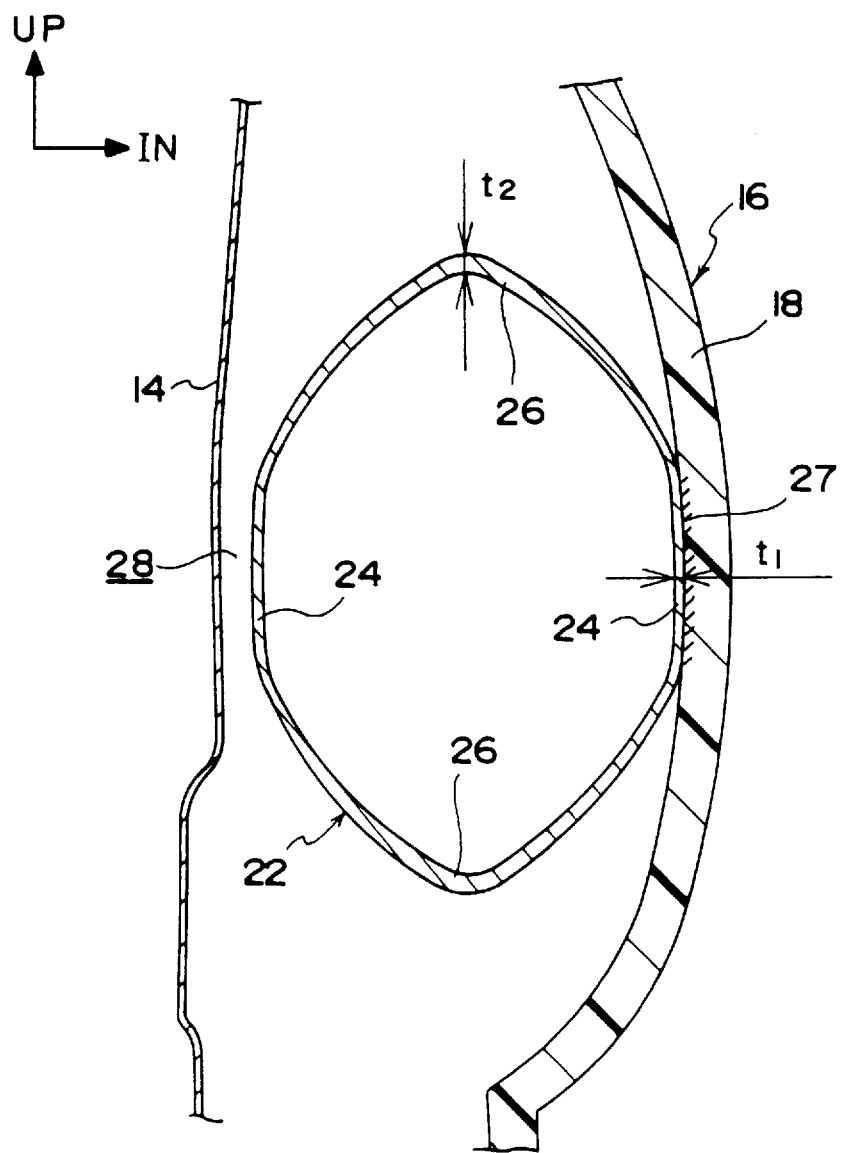
FIG. 1 is an enlarged cross-sectional view of essential portions, and illustrates in enlarged form a vertical cross-sectional view of an energy absorbing structure for a side portion of a vehicle body in accordance with a first embodiment.

As shown in FIG. 1 which illustrates the upper portion 18 of the door trim 16 and its vicinities in enlarged form, the cross section of the energy absorbing member 22 is formed in the shape of a substantially hollow ellipse in which the direction of its short axis is the transverse direction of the vehicle body and the direction of its long axis is the vertical direction of the vehicle body. Further, the wall thickness of the energy absorbing member 22 is set such that the wall thickness $t_2$ of its long-axis portion 26 is greater than the wall thickness $t_1$ of its short-axis portion 24. Incidentally, the wall thickness of a portion between the short-axis portion 24 and the long-axis portion 26 is formed in such a manner as to change gradually from $t_1$ to $t_2$.

Specifically, in this embodiment, the ellipticity of the energy absorbing member 22 and the wall thickness ratio between the short-axis portion 24 and the long-axis portion 26 are respectively set such that the ellipticity=short-axis diameter/long-axis diameter<0.75, and 0.3≦wall thickness ratio=wall thickness $t_1$/wall thickness $t_2$≦0.6. The energy absorbing member 22 in this embodiment is formed by extrusion molding using an aluminum alloy.

Further, the aforementioned energy absorbing member 22 is attached to the door trim 16 as, of the two short-axis portions 24, one on the inner side in the transverse direction of the vehicle body is bonded to a surface of the door trim 16 which is on the outer side in the transverse direction of the vehicle body by means of an adhesive 27 (e.g., a hot melt adhesive, a hot butyl rubber pressure-sensitive sealant, etc.). In a state in which the energy absorbing member 22 is attached to the door trim 16, a predetermined gap 28 is formed between the door inner panel 14 and the portion of the short-axis portion 24 of the energy absorbing member 22 on the outer side in the transverse direction of the vehicle body.

Next, a description will be given of the operation and advantages in accordance with the present invention.

During a collision, the door outer panel 12 of the side door 10 is deformed in the inward direction of the vehicle compartment (i.e., a primary collision). In addition, as a reaction at this time, the upper part of the occupant's body moves toward the door inner panel 14 side of the side door 10 and hits against the door trim 16 (i.e., a secondary collision). Specifically, a chest portion of the occupant hits against the upper portion 18 of the door trim 16, and a waist portion of the occupant hits against the armrest 20 of the door trim 16.

Here, in this embodiment, the pipe-shaped energy absorbing members 22, each having a predetermined configuration and set to a predetermined wall thickness, are respectively disposed between the upper portion 18 of the door trim 16 and the door inner panel 14 and between the armrest 20 of the door trim 16 and the door inner panel 14, so that the load acting on the occupant during the secondary collision can be absorbed, as will be described below. Incidentally, in the description that follows, a chest portion of the occupant will be cited as an example.

First, in an initial period of the secondary collision, as the chest portion of the occupant hits against the upper portion 18 of the door trim 16, the energy absorbing member 22 is pressed toward the door inner panel 14 side and abuts against the surface of the door inner panel 14 on the inner side of the vehicle compartment. Consequently, the energy absorbing member 22 is subjected to a reaction force F from the door inner panel 14 and undergoes compressive plastic deformation in the transverse direction of the vehicle body (in the direction of its short axis), thereby assuming the shape of a track of an athletic ground (see FIG. 4A). Here, in this embodiment, since the energy absorbing member 22 in its state before collision (i.e., in an assembled state) is formed such that its cross section is formed in the shape of a substantially hollow ellipse in which the direction of its short axis is the transverse direction of the vehicle body and the direction of its long axis is the vertical direction of the vehicle body, the energy absorbing member 22 is liable to undergo plastic deformation at its short-axis portions 24. For this reason, when the energy absorbing member 22 is subjected to the reaction force F from the door inner panel 14, its short-axis portions 24 undergo plastic deformation relatively easily, thereby making it possible to suppress a sharp rise in the load during the initial period of the collision (see the portion of the curve indicated by an arrow P in the energy absorption characteristic shown in FIG. 5).

Figures 4A, 4B:
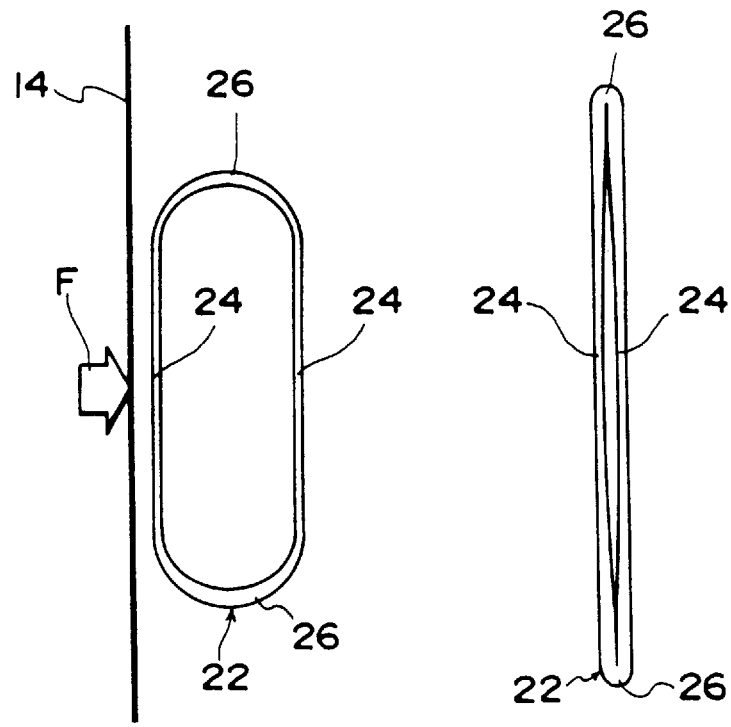
FIG. 4A is an explanatory diagram illustrating a process of compressive plastic deformation of the energy absorbing member shown in FIG. 1.
FIG. 4B is an explanatory diagram illustrating a process of compressive plastic deformation of the energy absorbing member shown in FIG. 1.
Figure 5:
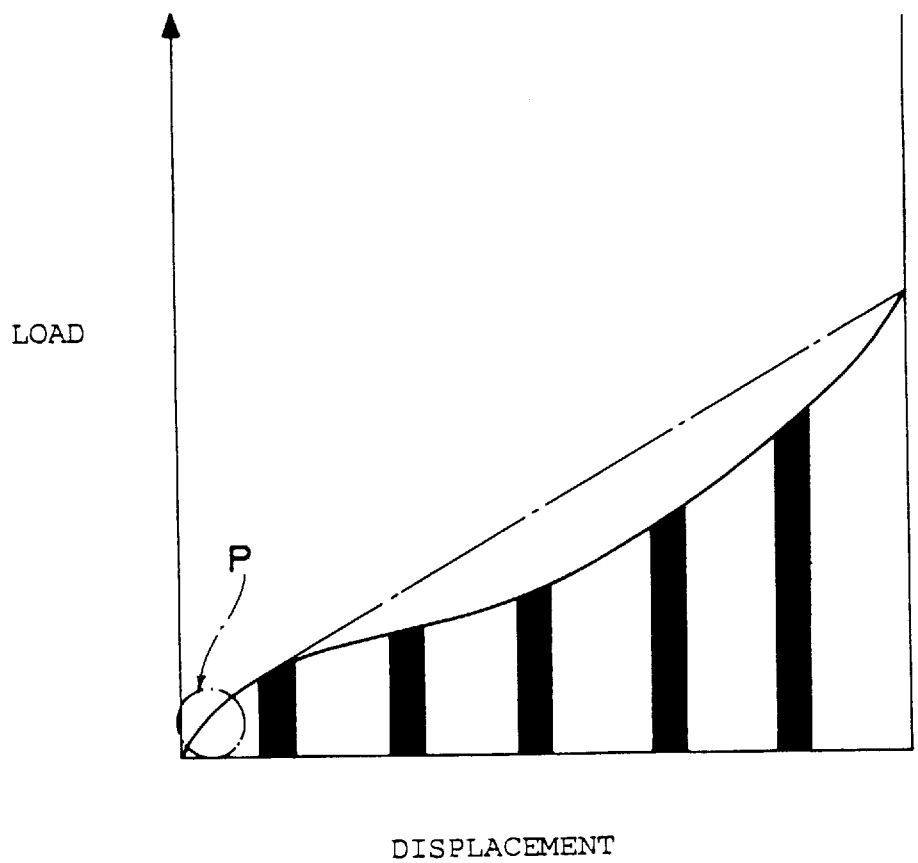
FIG. 5 is a characteristic diagram illustrating an energy absorbing characteristic during a side collision in a case where the energy absorbing member shown in FIG. 1 is used.

After the initial period of the secondary collision, the energy during the secondary collision of the chest portion of the occupant is absorbed while the energy absorbing member 22 undergoes compressive plastic deformation in the transverse direction of the vehicle body from the state shown in FIG. 4A to the state shown in FIG. 4B. Here, in this embodiment, since the wall thickness of the energy absorbing member 22 is set such that the wall thickness $t_2$ of its long-axis portion 26 is greater than the wall thickness $t_1$ of its short-axis portion 24, and the wall thickness of a portion between these portions changes gradually, the plastic deformation of the energy absorbing member 22 gradually proceeds from the short-axis portions 24, i.e., thin wall sides, toward the long-axis portions 26, i.e., thick wall sides. For this reason, after the initial period of the collision, the load increases at a substantially fixed rate with an increase in displacement, as shown in FIG. 5. Incidentally, the characteristic indicated by the chain line in FIG. 5 shows a targeted characteristic concerning the energy absorption during a side collision.

As described above, in this embodiment, the cross section of the energy absorbing member 22 is formed in the shape of a substantially hollow ellipse in which the direction of its short axis is the transverse direction of the vehicle body and the direction of its long axis is the vertical direction of the vehicle body, and the wall thickness $t_2$ Of the long-axis portion 26 is made greater than the wall thickness $t_1$ of the short-axis portion 24. Consequently, the characteristic of energy absorption by the energy absorbing member 22 during a side collision can be made an ideal characteristic (the rightwardly rising characteristic that while the sharp rise in the load during an initial period of the secondary collision of the occupant is being suppressed, the load subsequently increases at a fixed rate with an increase in displacement).

In particular, since in this embodiment settings are provided such that the ellipticity=short-axis diameter/long-axis diameter$\leq 0.75$, and $0.3 \leq$ wall thickness ratio=wall thickness $t_1$/wall thickness $t_2 \leq 0.6$, it is possible to provide a gentler rightwardly rising, ideal energy absorption characteristic.

In addition, in accordance with this embodiment, the energy absorption characteristic of the energy absorbing member 22 can be arbitrarily adjusted by appropriately changing the ellipticity of the energy absorbing member 22 and the wall thickness ratio between the short-axis portion 24 and the long-axis portion 26. Accordingly, it is readily possible to tune the energy absorption characteristic.

Further, in accordance with this embodiment, since the cross section of the energy absorbing member 22 is formed in the shape of a substantially hollow ellipse, as compared with the case where it is formed in the shape of a hollow circular cross section, it is possible to visually confirm the assembling direction in a case where the operator engages in the operation of assembling the energy absorbing member 22. For this reason, it is possible to prevent the erroneous assembling of the energy absorbing member 22, thereby making it possible to improve the operating efficiency with which the energy absorbing member 22 is assembled.

In addition, in accordance with this embodiment, since the arrangement provided is such that after the cross section of the energy absorbing member 22 is formed in the shape of a substantially hollow ellipse, the short-axis 24 of the energy absorbing member 22 on the inner side in the transverse direction of the vehicle body is secured to the surface of the door trim 16 on the outer side in the transverse direction of the vehicle body by means of the adhesive 27, the portions of the two members which are bonded are bonded not by bonding based on line contact but by bonding based on surface contact. For this reason, it is possible to enlarge the bonding area of the energy absorbing member 22 with respect to the door trim 16. Accordingly, it is possible to prevent the energy absorbing member 22 from becoming peeled off the door trim 16 and slipping off due to the vibrations of the vehicle body at high temperature over extended periods of time.

Further, since, in this embodiment, the predetermined gap 28 is set between the energy absorbing member 22 and the door inner panel 14, even if the vibrations of the vehicle body are applied, the outer portion in the transverse direction of the vehicle body of the short-axis portion 24 of the energy absorbing member 22 and the door inner panel 14 are prevented from sliding relative to each other. Accordingly, it is possible to prevent the occurrence of abnormal noise between the two members.

Figure 6:
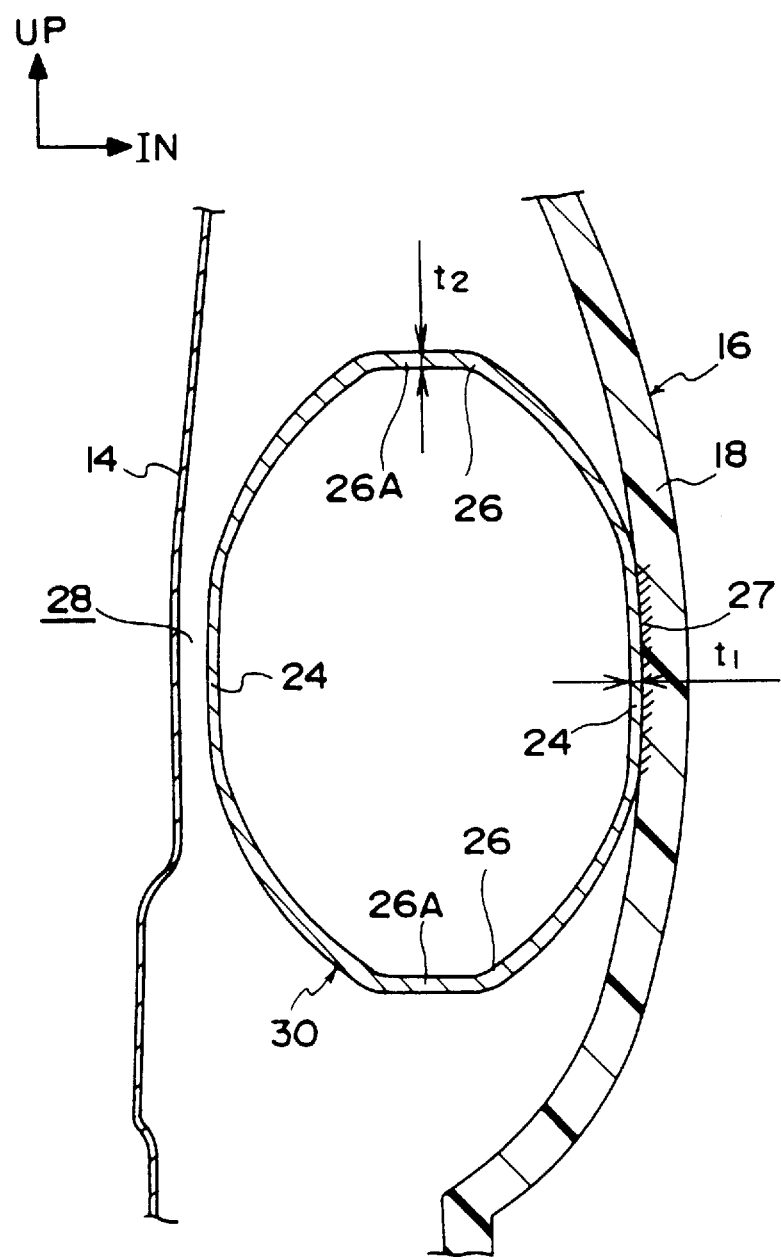
FIG. 6 is an enlarged cross-sectional view of essential portions, and illustrates in enlarged form a vertical cross-sectional view of an energy absorbing structure at the side portion of the vehicle body in accordance with a second embodiment.
Figure 7A:
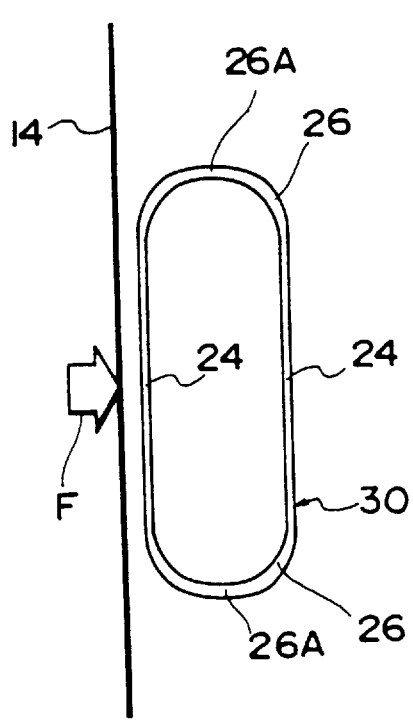
FIG. 7A is an explanatory diagram illustrating the process of compressive plastic deformation of the energy absorbing member shown in FIG. 6.
Figure 7B:
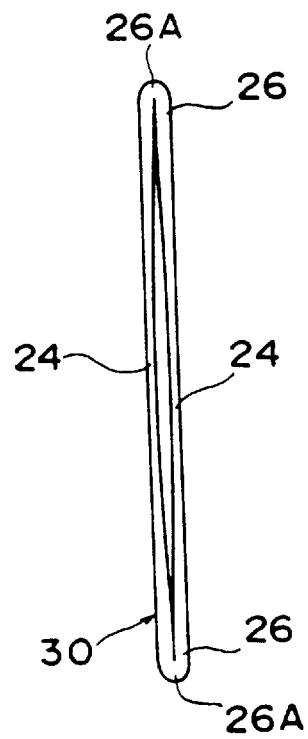
FIG. 7B is an explanatory diagram illustrating the process of compressive plastic deformation of the energy absorbing member shown in FIG. 6.
Figure 9:
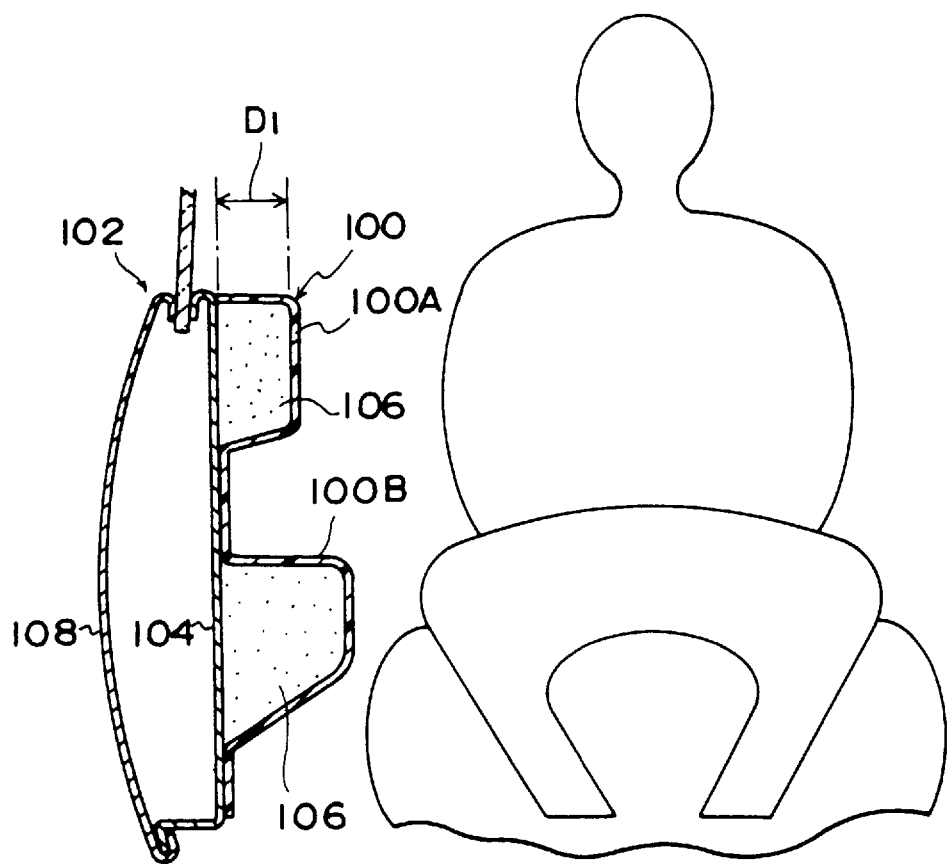
FIG. 9 is a front elevational view illustrating a conventional example using urethane or the like as the energy absorbing member, and corresponds to FIG. 2.
Figure 10:
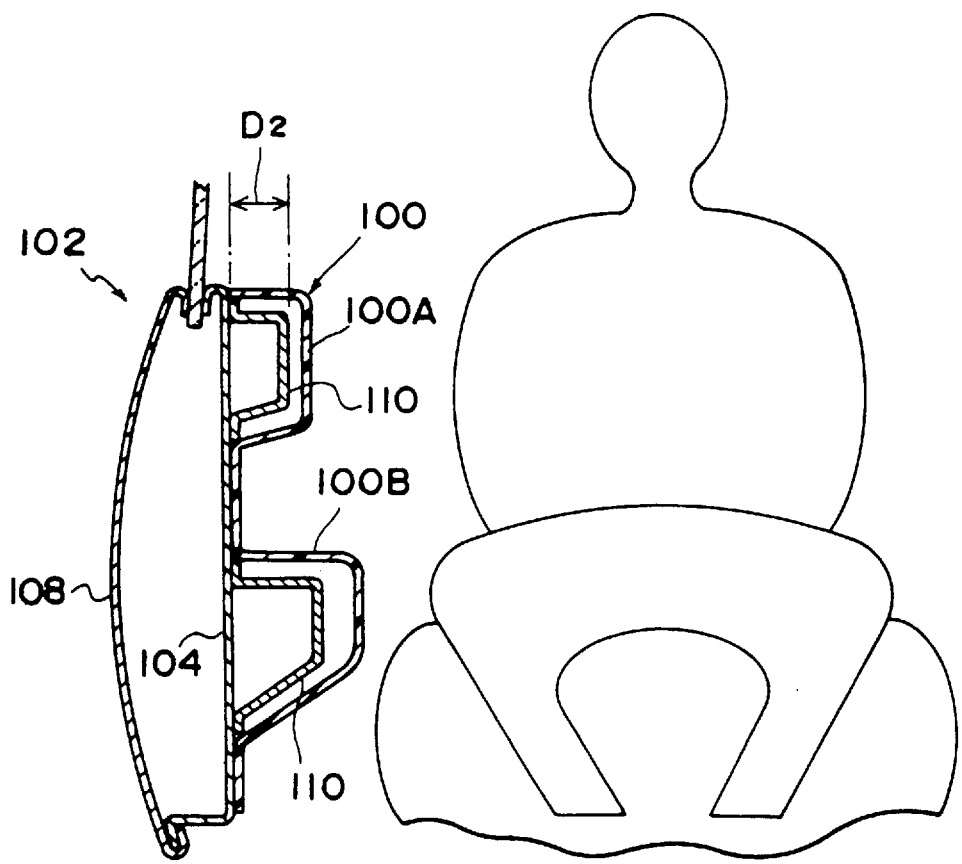
FIG. 10 is a front elevational view illustrating a conventional example using steel or the like as the energy absorbing member, and corresponds to FIG. 9.
Figure 11:
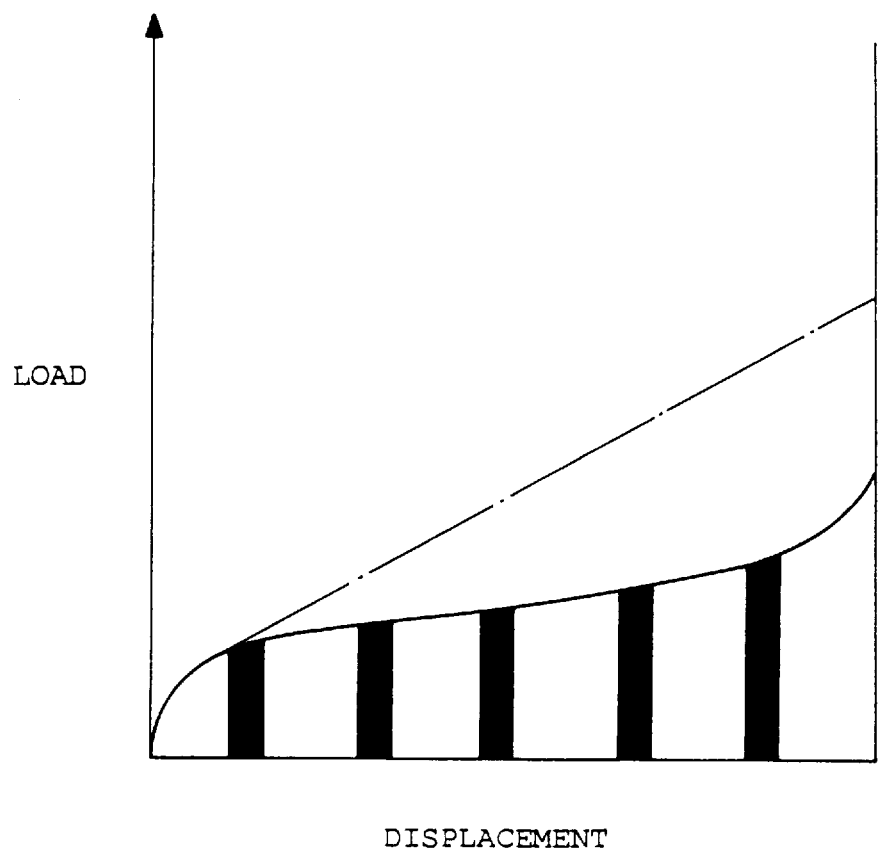
FIG. 11 is a characteristic diagram illustrating an energy absorbing characteristic during a side collision in a case where the energy absorbing member shown in FIG. 10 is used.

Referring next to FIGS. 6 to 8, a description will be given of a second embodiment of the present invention. Incidentally, the same component parts as those of the above-described first embodiment will be denoted by the same reference numerals, and a description thereof will be omitted.

As shown in FIG. 6, an energy absorbing member 30 of this embodiment is characterized in that straight portions 26A whose planar direction coincides with the transverse direction of the vehicle body are respectively formed in the long-axis portions 26. It should be noted that, in the same way as the above-described embodiment, the cross section of the energy absorbing member 30 is formed in the shape of a substantially hollow ellipse in which the direction of its short axis is the transverse direction of the vehicle body and the direction of its long axis is the vertical direction of the vehicle body, and the wall thickness $t_2$ of the long-axis portion 26 is made greater than the wall thickness $t_1$ of the short-axis portion 24. In addition, the ellipticity and the wall thickness ratio are also set in the same way as the above-described embodiment.

In accordance with the above-described arrangement, the load at the time of the secondary collision of the occupant is absorbed in the following manner.

First, in the initial period of the secondary collision, action takes place in a manner similar to that of the above-described embodiment. Namely, the energy absorbing member 30 is subjected to the reaction force F from the door inner panel 14 and undergoes compressive plastic deformation in the transverse direction of the vehicle body (i.e., in the direction of its short axis), thereby assuming the shape of a track (see FIG. 7A). At this time, since the energy absorbing member 30 in this embodiment is also formed such that its cross section is formed in the shape of a substantially hollow ellipse in which the direction of its short axis is the transverse direction of the vehicle body and the direction of its long axis is the vertical direction of the vehicle body, the energy absorbing member 30 is liable to undergo plastic deformation at its short-axis portions 24. Hence, the energy absorbing member 30 undergoes plastic deformation relatively easily at its short-axis portions 24, thereby making it possible to suppress a sharp rise in the load during the initial period of the collision (see the portion of the curve indicated by the arrow P in the energy absorption characteristic shown in FIG. 8).

After the initial period of the secondary collision as well, action generally takes place in a manner similar to that of the above-described embodiment. That is, the energy during the secondary collision of the chest portion of the occupant is absorbed as the energy absorbing member 30 undergoes compressive plastic deformation in the transverse direction of the vehicle body from the state shown in FIG. 7A to the state shown in FIG. 7B. Here, in this embodiment, since the wall thickness of the energy absorbing member 30 is set such that the wall thickness $t_2$ of its long-axis portion 26 is greater than the wall thickness $t_1$ of its short-axis portion 24, and the wall thickness of a portion between these portions changes gradually, and since the straight portions 26A whose planar direction coincides with the transverse direction of the vehicle body are respectively formed in the long-axis portions 26, the plastic deformation of the energy absorbing member 30 gradually proceeds from the short-axis portions 24, i.e., thin wall sides, toward the long-axis portions 26, i.e., thick wall sides. Furthermore, since the load increases when the straight portions 26A undergo compressive plastic deformation in the transverse direction of the vehicle body (see the portion of the curve indicated by the arrow Q in the energy absorption characteristic shown in FIG. 8), the energy absorbing member 30 exhibits an energy absorption characteristic close to the targeted characteristic.

In accordance with this embodiment, since the straight portions 26A whose planar direction coincides with the transverse direction of the vehicle body are respectively formed in the long-axis portions 26 of the energy absorbing member 30, as described above, the characteristic of energy absorption during a side collision can be made a more ideal energy absorption characteristic.

In addition, since the straight portions 26A in this embodiment can be formed simultaneously when the energy absorbing member 30 is molded, there is an advantage in that the number of fabrication steps does not increase.

Although, in this embodiment, the straight portions 26A whose planar direction coincides with the transverse direction of the vehicle body are respectively formed in the long-axis portions 26 of the energy absorbing member 30, the present invention is not limited to the same, and it is possible to use any other high-rigidity members insofar as they are capable of enhancing the rigidity in the transverse direction of the vehicle body. For example, it is possible to adopt an arrangement in which a plurality of beads extending in the transverse direction of the vehicle body are formed in the long-axis portions 26 at predetermined intervals.

What is claimed is:

1. An energy absorbing structure for a side portion of a vehicle body, comprising:

a plastically deformable energy absorbing member which is disposed at a predetermined position in the side portion of the vehicle body against which a side portion of an upper part of a vehicle occupant's body hits during a side collision, said energy absorbing member being arranged such that a longitudinal direction thereof coincides with a longitudinal direction of the vehicle body, a cross section of said energy absorbing member being formed in a shape of a substantially hollow ellipse in which a direction of a short axis thereof is a transverse direction of the vehicle body and a direction of a long axis thereof is a vertical direction of the vehicle body, a wall thickness of said energy absorbing member being set such that wall thicknesses of long-axis portions thereof corresponding to the long axis are greater than wall thicknesses of short-axis portions thereof corresponding to the short axis.

2. An energy absorbing structure for a side portion of a vehicle body according to claim 1, wherein the ellipticity of said energy absorbing member is set to approximately 0.7, and a ratio of the wall thicknesses of the short-axis portions to the wall thicknesses of the long-axis portions of said energy absorbing member is set to be greater than or equal to 0.3 and not more than 0.6.

3. An energy absorbing structure for a side portion of a vehicle body according to claim 2, wherein said energy absorbing member is provided with a high-rigidity portion disposed in each of the long-axis portions for enhancing rigidity in the transverse direction of the vehicle body.

4. An energy absorbing structure for a side portion of a vehicle body according to claim 3, wherein said energy absorbing member is disposed between a door inner panel constituting a part of a side door and a door trim disposed at a vehicle transverse direction inner side of said door panel, and the short-axis portion located on an inner side in the transverse direction of the vehicle body is secured to a vehicle compartment outer-side surface of said door trim by means of an adhesive.

5. An energy absorbing structure for a side portion of a vehicle body according to claim 4, wherein said energy absorbing member is disposed in such a manner as to be provided with a gap with respect to said door inner panel.

6. An energy absorbing structure for a side portion of a vehicle body according to claim 2, wherein said energy absorbing member is disposed between a door inner panel constituting a part of a side door and a door trim disposed at a vehicle transverse direction inner side of said door panel, and the short-axis portion located on an inner side in the transverse direction of the vehicle body is secured to a vehicle compartment outer-side surface of said door trim by means of an adhesive.

7. An energy absorbing structure for a side portion of a vehicle body according to claim 6, wherein said energy absorbing member is disposed in such a manner as to be provided with a gap with respect to said door inner panel.

8. An energy absorbing structure for a side portion of a vehicle body according to claim 1, wherein said energy absorbing member is provided with a high-rigidity portion disposed in each of the long-axis portions for enhancing rigidity in the transverse direction of the vehicle body.

9. An energy absorbing structure for a side portion of a vehicle body according to claim 8, wherein said energy absorbing member is disposed between a door inner panel constituting a part of a side door and a door trim disposed at a vehicle transverse direction inner side of said door panel, and the short-axis portion located on an inner side in the transverse direction of the vehicle body is secured to a vehicle compartment outer-side surface of said door trim by means of an adhesive.

10. An energy absorbing structure for a side portion of a vehicle body according to claim 9, wherein said energy absorbing member is disposed in such a manner as to be provided with a gap with respect to said door inner panel.

11. An energy absorbing structure for a side portion of a vehicle body according to claim 1, wherein said energy absorbing member is disposed between a door inner panel constituting a part of a side door and a door trim disposed at a vehicle transverse direction inner side of said door panel, and the short-axis portion located on an inner side in the transverse direction of the vehicle body is secured to a vehicle compartment outer-side surface of said door trim by means of an adhesive.

12. An energy absorbing structure for a side portion of a vehicle body according to claim 11, wherein said energy absorbing member is disposed in such a manner as to be provided with a gap with respect to said door inner panel.

13. An energy absorbing structure for a side portion of a vehicle body, comprising:

a plastically deformable energy absorbing member which is disposed between a side door and a door trim of the vehicle body against which a side portion of an upper part of a vehicle occupant's body hits during a side collision, said energy absorbing member being arranged such that a longitudinal direction thereof coincides with a longitudinal direction of the vehicle body, a cross section of said energy absorbing member being formed in a shape of a substantially hollow ellipse in which a direction of a short axis thereof is a transverse direction of the vehicle body and a direction of a long axis thereof is a vertical direction of the vehicle body, a wall thickness of said energy absorbing member being set such that wall thicknesses of long-axis portions thereof corresponding to the long axis are greater than wall thicknesses of short-axis portions thereof corresponding to the short axis, wherein the ellipticity of said energy absorbing member is set to approximately 0.7, and a ratio of the wall thicknesses of the short-axis portions to the wall thicknesses of the long-axis portions of said energy absorbing member is set to be greater than or equal to 0.3 and not more than 0.6.

14. An energy absorbing structure for a side portion of a vehicle body according to claim 13, wherein said energy absorbing member is provided with a high-rigidity portion disposed in each of the long-axis portions for enhancing rigidity in the transverse direction of the vehicle body.

15. An energy absorbing structure for a side portion of a vehicle body, comprising:

a plastically deformable energy absorbing member which is disposed at a predetermined position in the side portion of the vehicle body against which a side portion of an upper part of a vehicle occupant's body hits during a side collision, said energy absorbing member being arranged such that a longitudinal direction thereof coincides with a longitudinal direction of the vehicle body, a cross section of said energy absorbing member being formed in a shape of a substantially hollow ellipse in which a direction of a short axis thereof is a transverse direction of the vehicle body and a direction of a long axis thereof is a vertical direction of the vehicle body, a wall thickness of said energy absorbing member being set such that wall thicknesses of long-axis portions thereof corresponding to the long axis are greater than wall thicknesses of short-axis portions thereof corresponding to the short axis, wherein the ellipticity of said energy absorbing member is set to approximately 0.7, and a ratio of the wall thicknesses of the short-axis portions to the wall thicknesses of the long-axis portions of said energy absorbing member is set to be greater than or equal to 0.3 and not more than 0.6, and said energy absorbing member is provided with a plurality of straight portions disposed in each of the long-axis portions for enhancing rigidity in the transverse direction of the vehicle body.

16. An energy absorbing structure for a side portion of a vehicle body according to claim 15, wherein said energy absorbing member is disposed between a door inner panel constituting a part of a side door and a door trim disposed at a vehicle transverse direction inner side of said door panel, and the short-axis portion located on an inner side in the transverse direction of the vehicle body is secured to a vehicle compartment outer-side surface of said door trim by means of an adhesive, and wherein said energy absorbing member is disposed in such a manner as to be provided with a gap with respect to said door inner panel.

17. An energy absorbing structure for a side portion of a vehicle body according to claim 1, wherein said energy absorbing member is provided with a high-rigidity portion disposed in each of the long-axis portions for enhancing rigidity in the transverse direction of the vehicle body, and said high-rigidity portion includes a plurality of straight portions whose planar direction coincides with the transverse direction of the vehicle body.

\* \* \* \* \*